April 15, 1930.  C. H. BULL  1,754,848
ROLLER CUTTER DRILL
Filed Jan. 14, 1926  3 Sheets-Sheet 1

Inventor
Clinton H. Bull
Attorney

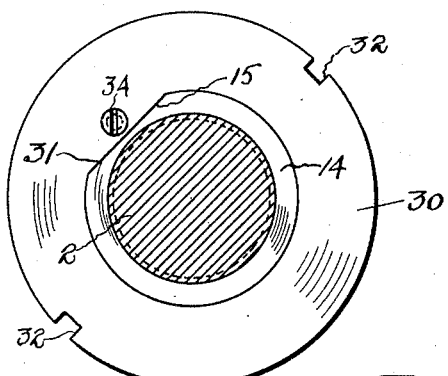
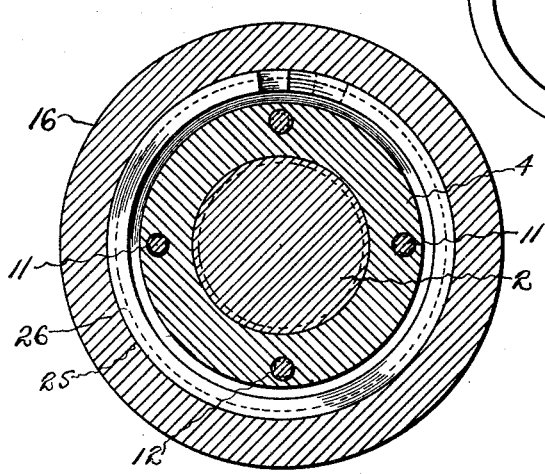
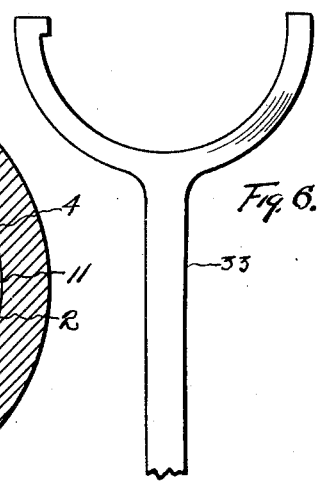
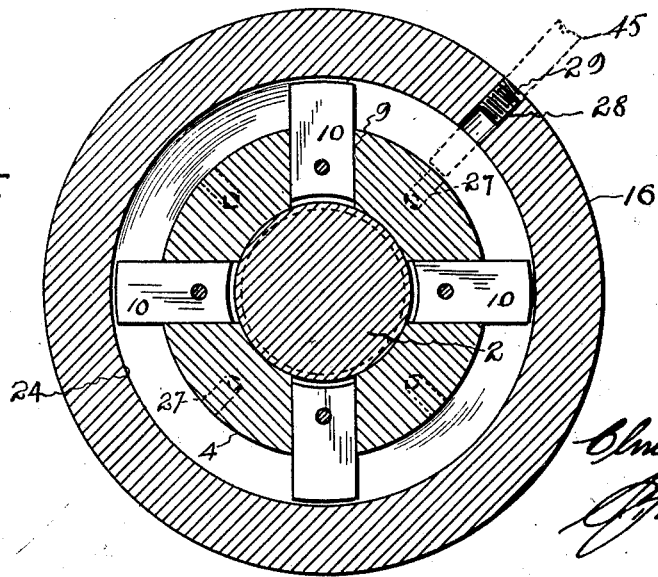

April 15, 1930.　　　　C. H. BULL　　　　1,754,848
ROLLER CUTTER DRILL
Filed Jan. 14, 1926　　　3 Sheets-Sheet 3

Inventor
Clinton H Bull
Attorney

Patented Apr. 15, 1930

1,754,848

UNITED STATES PATENT OFFICE

CLINTON H. BULL, OF COLUMBUS, OHIO, ASSIGNOR OF ONE-HALF TO CLARENCE C. LE MAY, OF COLUMBUS, OHIO

ROLLER-CUTTER DRILL

Application filed January 14, 1926. Serial No. 81,243.

The present invention is directed to improvements in well drills employing roller cutters.

The primary object of the invention is to provide a device of this character wherein the bearing surfaces for the roller cutters are large and stout and consequently strong enough to sustain the weight of the casings when drilling deep wells. In recent years oil and gas wells are being drilled comparatively deep and the weight of additional casings upon the bearings necessitated by deep drilling break or distort the bearings now in use due to this additional weight and it is to overcome this defect that the present invention has been perfected.

A further object of the invention is to provide bearings for this type of drill having novel means for securing the cutters thereon, the construction being such that the securing means are confined within the bearings in such manner that the accidental disengagement of the cutters from the bearings is positively prevented.

A still further object of the invention is to provide means whereby the bearings will be packed with a suitable lubricant which will be retained therein.

Still another object of the invention is to provide the roller cutters with novel forms of teeth and side reaming teeth forming a component part thereof to eliminate the use of additional side wall reamers as is now the practice.

With these and other objects in view, this invention resides in the novel features of construction, formation, combination and arrangement of parts to be hereinafter more fully described, claimed and illustrated in the accompanying drawings, in which:—

Figure 3 is a sectional view on line 3—3 of Figure 2.

Figure 4 is a sectional view on line 4—4 of Figure 2.

Figure 5 is a sectional view on line 5—5 of Figure 2.

Figure 6 is a view of the spanner wrench used.

Figure 1:
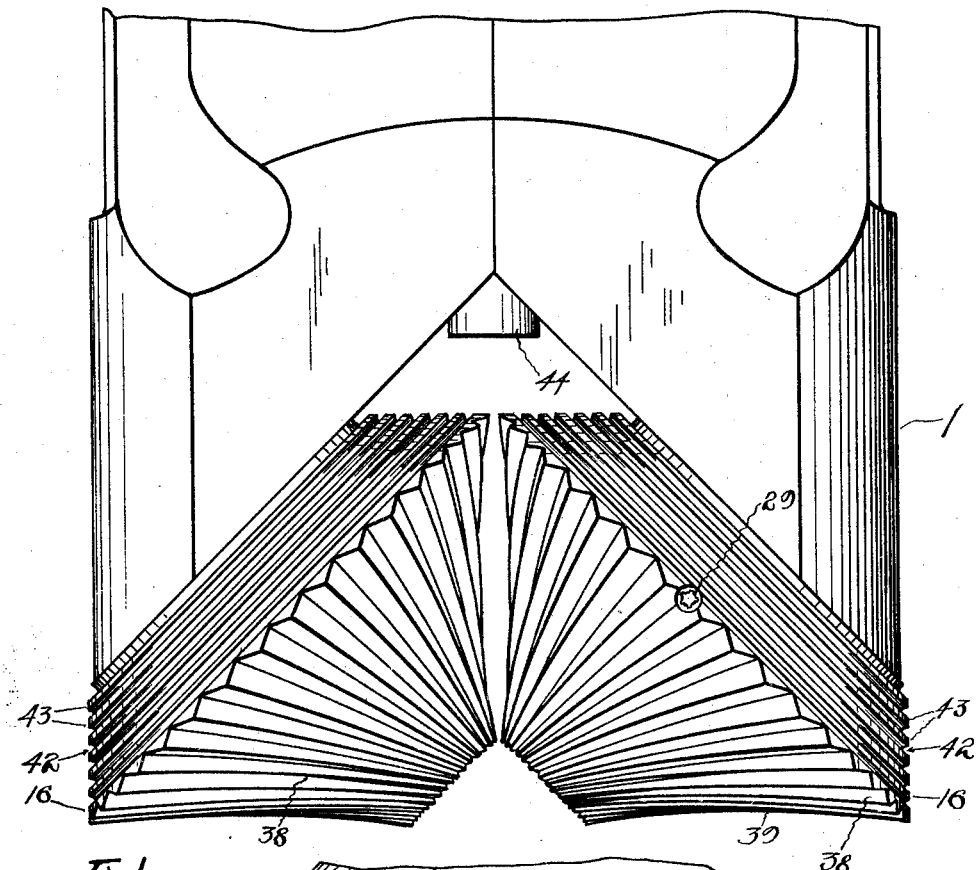
Figure 1 is fragmentary side elevation of the device.

Referring to the drawings, 1 designates a drill head provided with opposed beveled lower ends upon which are carried threaded spindles 2 having reduced extensions 3, all of which are of well known construction.

Bearings 4 are provided and have threaded sockets 5 for receiving the spindles 2, said bearings having openings 6 formed in the bases of the sockets and through which the extensions 3 extend, the purpose of which will appear later. The bearings are further provided with annular ribs 7 formed integral with their lower ends and are semi-circular in cross section, as clearly shown in Figure 2 of the drawings. These bearings are provided with annular shoulders 8 disposed at right angles to the perpendicular side walls thereof. A plurality of radial slots 9, preferably four in number, are formed in the bearings and in which are snugly engaged the locking dogs 10, said dogs being placed in the slots through the sockets 5 before the bearings are threaded upon the spindles. To hold the dogs firmly locked in the slots 10 set screws 11 are employed, said screws being located in suitable openings 12 formed in the bearings 4, as clearly illustrated in Figure 2 of the drawings.

These bearings are further provided with annular grooves 13 and annular flanges 14, the latter having flat faces 15, the purpose of which will later appear.

The roller cutters 16 which are designed to rotatably engage the bearings 4 are provided with recesses 17 having annular shoulders 18 formed in their inner peripheries, while the bases thereof are formed with annular grooves 19, semi-circular in cross section, said shoulders and grooves 19 engaging, respectively, the shoulders 8 and ribs 7 of said bearings.

The bases of the recesses 17 are provided with counterbores 20 which have their bases formed with grease containing pockets 21. By providing these pockets annular shoulders 22 are produced and upon which rest the lower ends of the bronze sleeves 23 and it is in these sleeves that the extensions 3 rotate and since the sleeves are of comparatively soft metal the extensions will not be subjected to wear.

At points of their major diameters the cutters 16 are provided with annular grooves 24 which are so located as to coincide with the outer ends of the slots 9 in order that the locking dogs 10 will have their outer ends slidably engaged therein. In this manner the cutters are rotatably interlocked with the bearings 4 and positively held against accidental disengagement therefrom. The positive locking of this type of cutter is vitally important owing to the fact that should they become disengaged from the bearings considerable expense is entailed in removing the same from the well being drilled. The cutters are further provided with annular grooves 25 which register with the grooves 13 of the bearings 4, there being contractible and expansible rings 26 adapted to co-operate with these grooves, said rings serving as additional means to prevent accidental disengagement of the cutters. These rings also serve to prevent the entrance of water and grit to the bearings and also prevent the escape of grease therefrom.

In order that the bearings can be effectively lubricated a plurality of ducts 27 are formed therein, the lower ends thereof opening into the grooves 19 while their upper ends communicate with the annular grooves 24 of the cutters 16 and at points between the dogs 10, there being threaded openings 28 in said cutters which communicate with the grooves 24. This opening is normally closed by a plug 29, upon the removal of which grease can be forced into the grooves 24 as needed.

It will be obvious that as the cutters roll during the drilling operation that the grease will be agitated in the grooves 24 by the dogs 10 and distributed to all points needing lubrication. As before stated the rings 26 will prevent the escape of grease from the bearings.

Removably engaged upon the bearing 4 are washers 30 having their inner peripheries formed with flat faces 31 adapted to interlock with the flat faces 15 of the flanges 14 and washers so that upon rotating the latter the bearings will be similarly rotated. These washers are further provided with notches 32 in order that a spanner wrench 33, as shown in Figure 6 can be used to rotate said washers to screw the bearings on or off of the spindles 2. The washers also aid the rings 26 in preventing water and grit from entering the bearings and can be removed to compensate for wear and are retained on the bearings by screws 34.

It will be observed that by forming the bearings 4 with shoulders 8 and ribs 7, which intimately contact, respectively, with the shoulders 18 and grooves 19, greater bearing surfaces are obtained and the wear will be evenly distributed. Owing to the snug fit of the bearings in the recesses 17 of the cutters and the ribs 7 in the grooves 19, as well as the presence of the dogs 10, wabbling of the cutters upon said bearings is positively prevented even as wear takes place from constant use. It will be further observed that the locking dogs 10 and rings 26 are contained entirely within the cutters 16, thereby preventing removal thereof as long as the cutters are engaged upon the bearings.

In devices of this type it is customary to form the spindles 2 integral with the heads 1 and it is essential that no wear be imparted to the extensions 3, therefore I have provided the sleeves 23 of bronze or the like to eliminate this defect.

Figure 7:
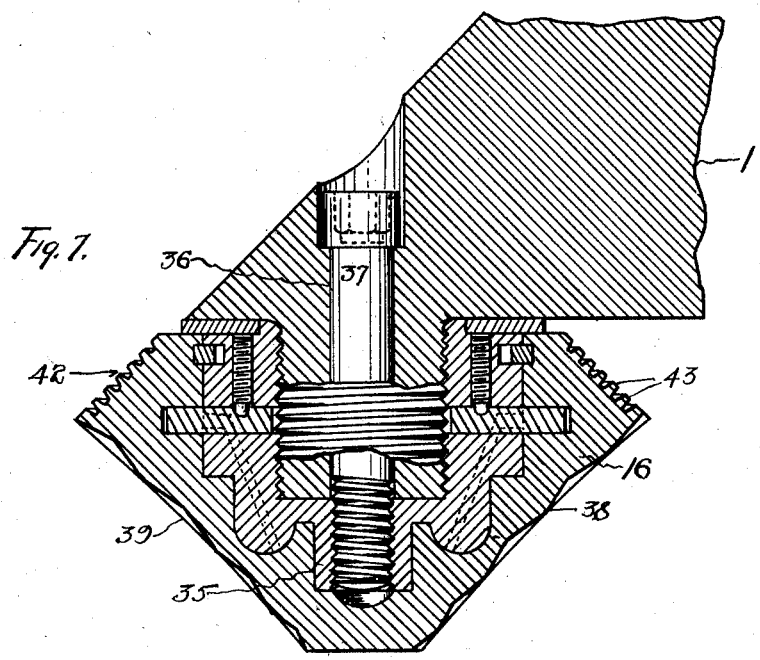
Figure 7 is a transverse sectional view through a cutter of slightly modified form.

In Figure 7 of the drawings, a slightly modified form of the invention, the means for securing the cutters 16 upon the bearings is identical with that of the preferred form, therefore the description of one will suffice for both on these features. This form of the invention differs from the preferred form in the elimination of the extensions 3 of the spindles 2 and the addition of integral interiorly threaded collars 35, the threads of which are left handed, while the threads of the spindles are right handed. The spindles 2 are further provided with longitudinal bores 36 which register with the openings of the collars 35, bolts 37 carried by the head 1 being engaged snugly in said bores with their threaded ends engaged with the threads of the collars, which as before stated are left handed threads. It will be apparent that when the rotation of the drill is reversed, which is necessary at times, that the right and left hand arrangement of the threads of the spindles 2 and collars 35 will tend to more firmly secure the bearings 4 upon the spindles during such rotation.

Figure 2:
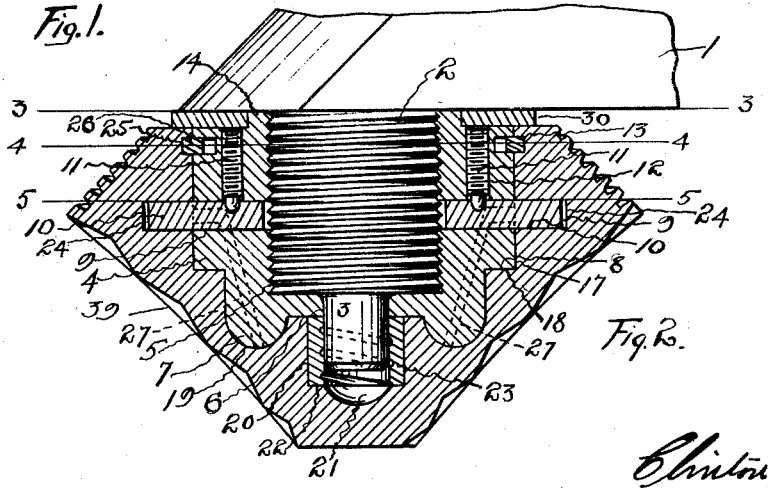
Figure 2 is a transverse sectional view through one of the cutters.
Figure 8:
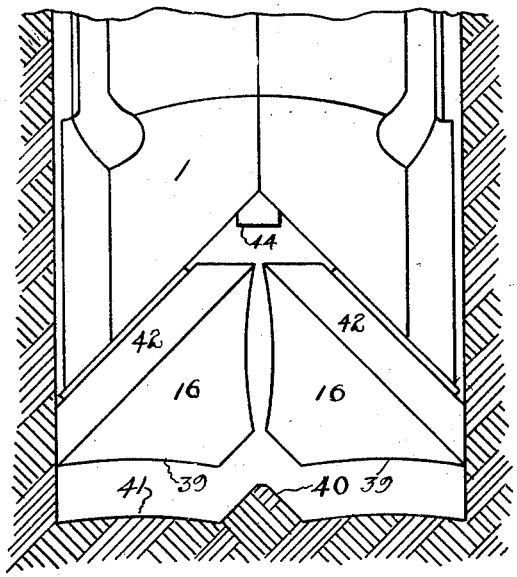
Figure 8 is a fragmentary side elevation of the device, showing somewhat diagrammatically the manner of cutting.

It will be observed upon reference to Figures 1 and 2 of the drawings that the cutting teeth 38 thereof are not only spirally arranged, but also concaved longitudinally, as at 39 so that the bottom of the hole being drilled will be cut as shown in Figure 8. These cutters 16 are approximately frusto-conical in contour so, that when drilling a core 40 will be formed in the bottom of the hole and since the teeth 38 are concaved the bottom of the hole will take a general convex formation, as at 41, and due to this the cutters will be free to rotate, but prevented from moving laterally, thus stabilizing the cutters upon their bearings and reducing wear due to lateral strain to a minimum.

The cutters 16 are further provided with beveled portions 42 on which are formed a plurality of cutting teeth 43, which are designed to subject the side wall of the hole to a shearing cutting action as the cutters rotate. With cutters designed in this manner the use of additional side wall reamers is not necessary.

Since the cutting teeth 43 are arranged in parallel relation with the beveled faces of the head 1, the wash water from the pipe 44 will be directed into the grooves between said teeth to wash the muck away. Owing to the fact that the teeth 43 are tangentially disposed with respect to the pipe 44 the flow of water from said pipe will not be retarded and directed against the head, consequently wear by erosion upon the beveled faces of said head is eliminated.

In Figure 5 of the drawings there is shown in dotted lines a rod 45 engaged in the opening 28 with its inner end extended into the groove 24 so as to be in the path of the dogs 10 to interlock therewith in order that the rod can be employed to interlock the cutter 16 and bearing 4 to screw the same on or off of the spindle 2.

What is claimed is:—

1. The combination with a rotary drill head, a spindle carried by the head, a bearing removably mounted on the spindle, a cutter rotatably mounted on the bearing, and a washer interlocked with the bearing and capable of being rotated to apply or remove the bearing from the spindle.

2. The combination with a drill head, of a threaded spindle thereon, a bearing removably threaded on the spindle, said bearing having a flange, a washer interlocked with the flange and capable of being rotated to apply or remove the bearing from the spindle, a cutter rotatable on the bearing, the cutter and bearing being provided, respectively, with co-inciding grooves, a ring common to the grooves for rotatably interlocking the bearing and cutter, dogs fixed in the bearing and having interlocking sliding engagement with the cutter, the cutter having a recess corresponding in shape to the bearing.

3. The combination with a drill head, of a threaded spindle carried thereby, the threaded end of the spindle being right handed, a bearing threaded on the spindle, a roller cutter journaled on the bearing, said bearing having a collar provided with interior threads of left hand formation, and a bolt passable through the spindle and having its threaded end engaged with the threads of the collar, as and for the purpose set forth.

4. In a roller drill, a pin, a bushing threadedly mounted thereon, a cutter rotatably secured upon said bushing and surrounding the end thereof, a ring attached to said bushing and extending over the base of said cutter, said ring having means provided whereby a hold may be secured by a wrench for attaching or removing said bushing from said pin.

5. In a roller drill, a pin, a bushing threadedly mounted thereon, a cutter rotatably secured upon said bushing and surrounding the end thereof, said bushing having a neck projecting beyond the end of said cutter, a ring attached to said neck, said ring having means provided whereby a hold may be secured by a wrench for connecting or disconnecting said bushing and said cutter assembly from said pin.

In testimony whereof I affix my signature.

CLINTON H. BULL.